United States Patent [19]
Fawcett

[11] Patent Number: 5,220,850
[45] Date of Patent: Jun. 22, 1993

[54] ZERO TOLERANCE DEVICE

[76] Inventor: Harry E. Fawcett, #7 35th Ave. NW., Gig Harbor, County of Pierce, Wash. 98334

[21] Appl. No.: 808,106

[22] Filed: Dec. 16, 1991

[51] Int. Cl.$^5$ ............................................. F16C 1/10
[52] U.S. Cl. ................................. 74/502.3; 74/502.4; 74/502.5
[58] Field of Search .......... 384/49; 74/500.5, 501.5 R, 74/502, 502.3, 502.5; 901/50; 414/918; 138/128, DIG. 8

[56] References Cited

U.S. PATENT DOCUMENTS

| | | | |
|---|---|---|---|
| 2,442,360 | 6/1948 | Heerkert | 74/502.3 |
| 2,845,813 | 8/1958 | Richoux | 74/501.5 |
| 3,154,966 | 11/1964 | Bratz | 74/502.3 |
| 3,287,990 | 11/1966 | Ellinger | 74/502.3 |
| 3,436,130 | 4/1969 | Grebert | 384/49 |
| 3,452,615 | 7/1969 | Gregory, Jr. | 74/502.3 |
| 3,464,285 | 9/1969 | McCabe | 74/502.3 |
| 3,580,103 | 5/1971 | Shreve | 74/502.3 |
| 4,075,905 | 2/1978 | Schaaphok | 74/502 |
| 4,133,222 | 1/1979 | Dooley | 74/501 R |
| 4,188,835 | 2/1980 | Ion | 74/501 R |
| 4,516,441 | 5/1985 | Paynter | 74/501 R |
| 4,575,297 | 3/1986 | Richter | 901/50 X |
| 4,690,014 | 9/1987 | Richoux | 74/501 R |
| 4,787,264 | 11/1988 | Tamarin | 74/502.3 |
| 5,105,678 | 4/1992 | Adelman et al. | 74/502.3 |

FOREIGN PATENT DOCUMENTS 189337 8/1986 France .

*Primary Examiner*—Leslie A. Braun
*Assistant Examiner*—Khoi Q. Ta
*Attorney, Agent, or Firm*—James F. Leggett

[57] ABSTRACT

Flexible remote controls of the type using ball bearings along their length are improved by externally imparting reversing bends along their length which bends are imparted by two semi-circular sleeves, having mirror image mating faces containing an interior contour of reversing radii, having arcs being the minimum bend radius of the partial flexible ball bearing remote control to which it is applied, which come tangent at the center and run out an equal depth from the centerline and repeat throughout the length of the flexible ball bearing remote control.

2 Claims, 2 Drawing Sheets

ZERO TOLERANCE DEVICE

BACKGROUND OF THE INVENTION

This invention relates generally to flexible remote controls which utilize ball bearings along their length.

Flexible ball bearing remote controls are illustrated in U.S. Pat. No. 3,580,103 to R. L. Shreve. A common problem with this type of control is the susceptibility of the ball bearings to sliding and stacking up at one end due to an operational environment which includes high gravity forces, such as in fighter aircraft, or long vertical lengths, such as in ocean-going vessels.

To avoid sliding and stacking up, various mechanical additions to the internal structure of the flexible ball bearing remote controls have been disclosed, such as U.S. Pat. No. 4,787,264 to C. S. Tamarin, U.S. Pat. No. 3,154,966 to O. J. Bratz, and U.S. Pat. No. 4,075,905 to R. W. Schasphok. Although these inventions effectively maintain the spacing between the ball bearings along the length of the flexible ball bearing remote control, they do not eliminate sliding and stacking up in high gravity operational environments.

The prior art has tried to solve these deficiencies of sliding and stacking up with mechanical changes to the flexible ball being remote control itself, so that the improvement was not adaptable to existing flexible ball bearing remote controls and required the total replacement thereof at substantial expense.

Accordingly, the object of this invention is to provide an improved device applied externally to existing flexible ball bearing remote controls, such as those of R. A. Dooley described in U.S. Pat. No. 4,133,222 and of R. Richoux described in U.S. Pat. No. 4,690,014, in new or existing installations, which eliminates sliding and stacking up of the flexible ball bearing remote control at one end in an operational environment including high gravity forces.

SUMMARY OF THE INVENTION

In accordance with this invention, two semi-circular sleeves, having mirror image mating faces containing an interior contour of reversing radii, having arcs being the minimum bend radius of the particular flexible ball bearing remote control to which it is applied, which come tangent at the centerline and run out at an equal depth from the centerline and repeat are applied to the flexible ball bearing remote control so as to impart these reversing bends along its length. The bends maintain sufficient friction between the individual ball bearings and the surface of the face on which they are resting so that control commands result in rolling of the ball bearings along the face rather than sliding.

For a fuller understanding of the invention, reference is now made to the accompanying drawings.

DESCRIPTION OF PREFERRED EMBODIMENTS

Figure 1:
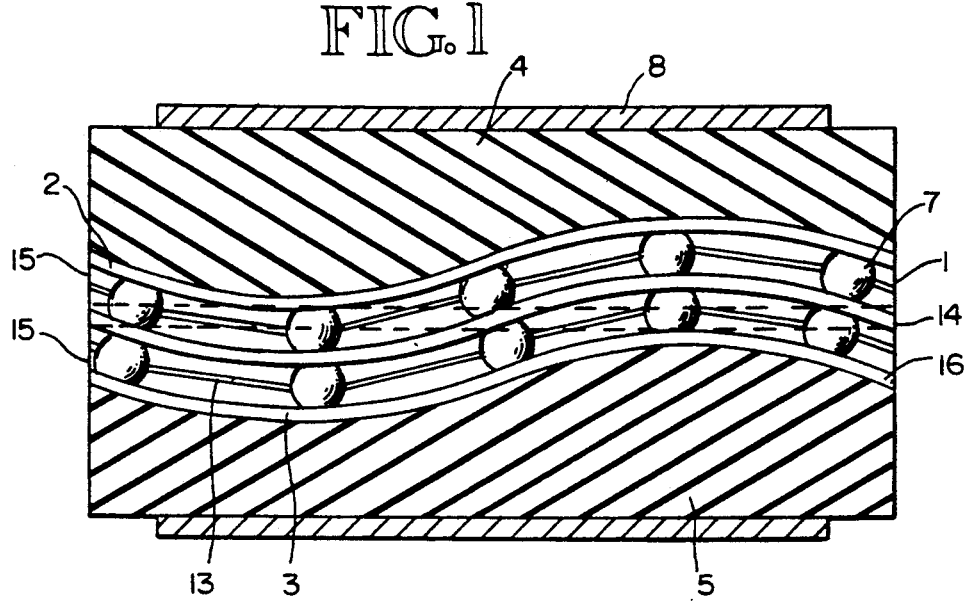
FIG. 1 is a length-wise, cross-sectional view of a flexible ball bearing remote control contained in the two semi-circular sleeves of the invention.

FIG. 1 shows a length wise, cross-sectional view of the zero tolerance device within which rides one version of a flexible ball bearing remote control (1), comprised of two parallel races (15), within a hollow tube (16), having a common inside face (14) through which ball guides (13) and ball bearings (7) track. A continuous reversing bend, having an arc being the minimum bend radius of the flexible ball bearing remote control (1), to which it is applied, is imparted to the flexible ball bearing remote control (1) by mirror image mating faces (2), (3), on the interior contour of two semi-circular sleeves (4), (5), being of reversing radii which come tangent at the centerline (6) and run out at an equal depth from the centerline (6) and repeat for one complete cycle and preferably attached near the mid point in the length of the flexible ball bearing remote control (1).

It is apparent from FIG. 1 that the ball bearings (7) remain in continuous contact with the sides of their respective races. The bend imparted to the flexible ball bearing remote control (1) by the mirror image mating faces (2), (3), being the minimum bend radius of the particular flexible ball bearing remote control (1) installed results in the friction, between the sides of the races (14), (16) and the ball bearings (7), being sufficient to prevent sliding of the ball bearings (7) or stacking up, even in high gravity environments, without binding or restricting the operation of the flexible ball bearing remote control (1).

Each flexible ball bearing remote control has a minimum bend radius which, if exceeded, will damage the control.

Figure 2:
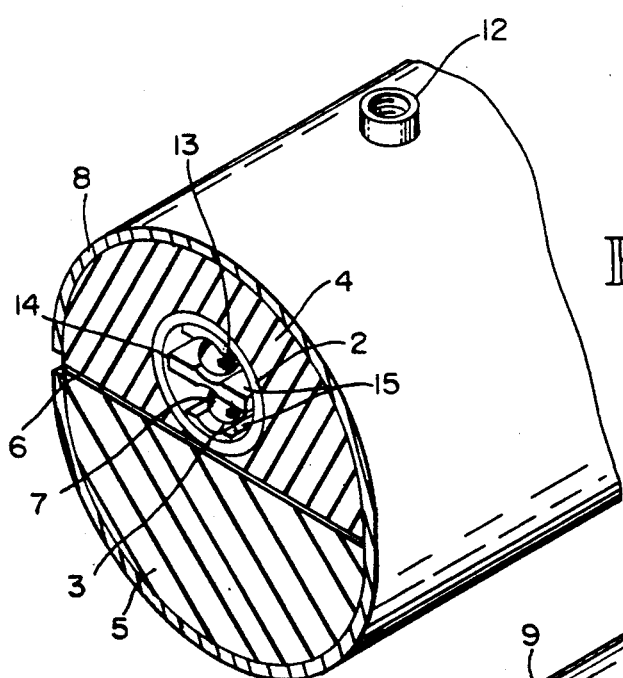
FIG. 2 is a perpendicular cross-sectional view of a flexible ball bearing remote control contained in the two semi-circular sleeves of the invention.

FIG. 2 shows a perpendicular cross-sectional view of the retaining cover (8) being comprised of a single stainless steel tube being cut along its length and being slightly less in diameter than the semi-circular sleeves (4), (5) so as to hold the mirror image mating faces (2), (3) securely on the flexible ball bearing remote control (1).

Figure 3:
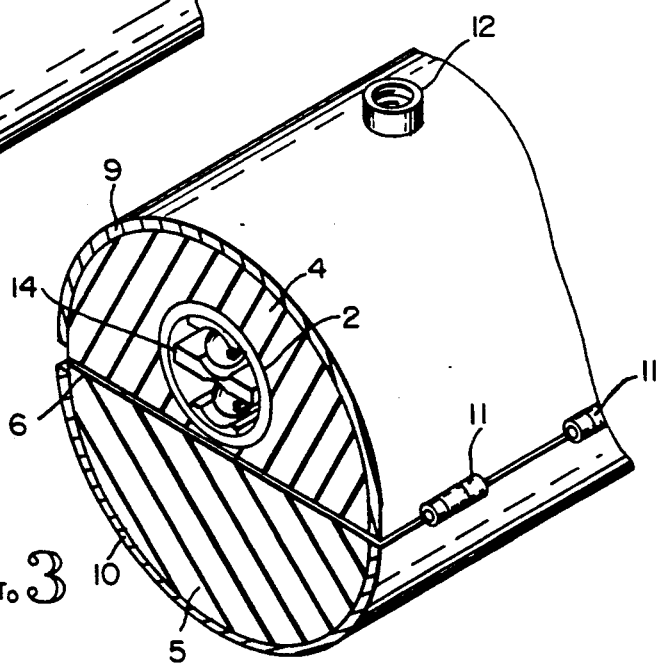
FIG. 3 is a side view of the retaining cover with spring hinges along its length.

FIG. 3 shows a perpendicular cross-sectional view of the retaining cover (8) showing one version of the invention comprised of two semi-circular halves (9), (10) being held in tension sufficient to maintain the required relationship between the mirror image mating faces (2), (3) and the flexible ball bearing remote control (1) by means of spring hinges (11), loaded to the closed position, along its length. Regularly spaced along the external surface of the retaining cover (8) are extruded lugs (12) to allow attachment of the cover to the operational environment.

Figure 4:
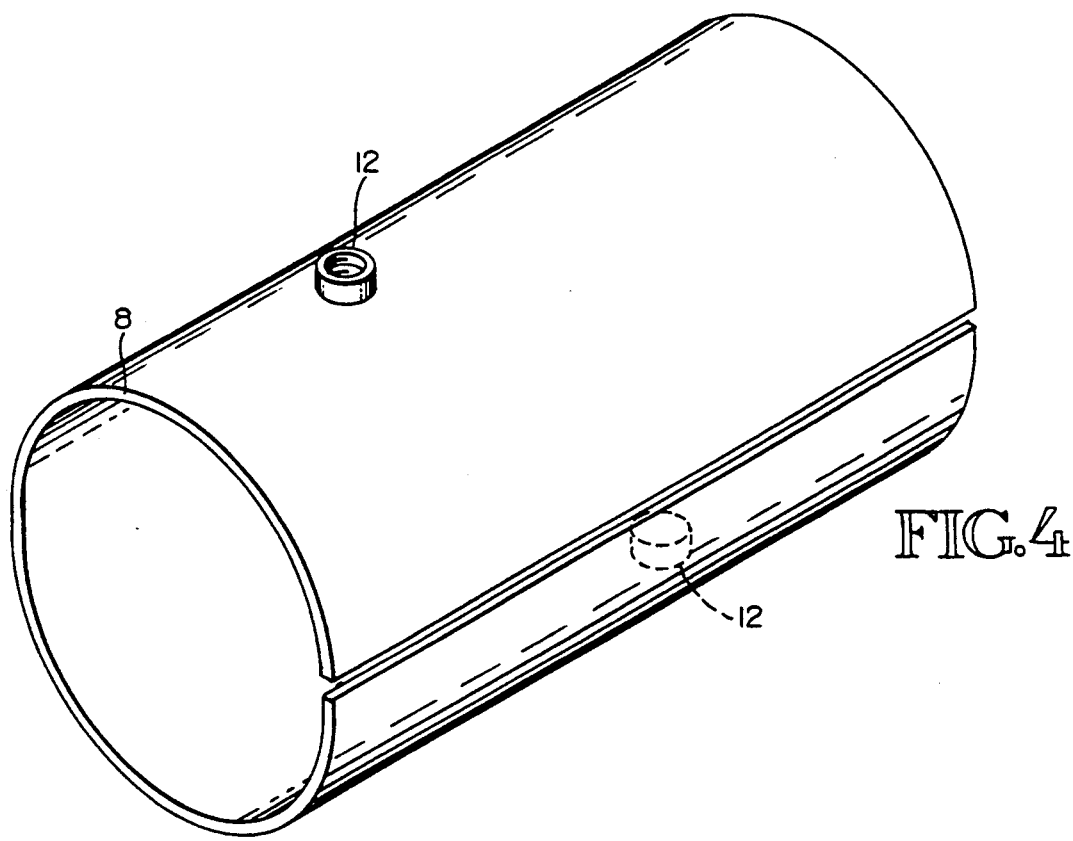
FIG. 4 is a perspective view of the retaining cover.

FIG. 4 is a perspective view of the retaining cover (8) in its preferred embodiment as a single piece of stainless steel tubing split its length.

Figure 5:
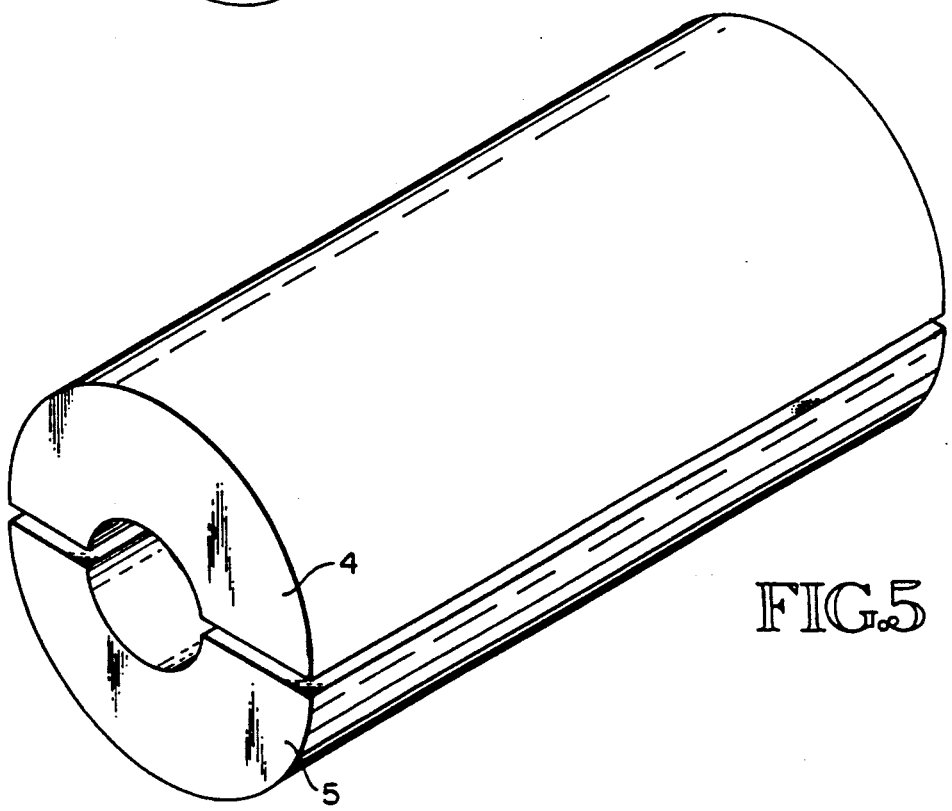
FIG. 5 is a perspective view of the two semi-circular sleeves.

FIG. 5 is a perspective view of the two semi-circular sleeves (4), (5).

Various modifications will become obvious to those skilled in the art from the drawings and disclosure herein without departing from the scope of the invention, such as utilizing materials of various coefficients of friction on the surface of the mirror image mating faces (2), (3) or constructing the retaining cover (8) of a single piece of suitable material in the form of a spring pin, which is placed around the semi-circular sleeves (4), (5).

Accordingly, only such limitations should be imposed on the invention as are set forth in the appended claims.

I claim:

1. A device for preventing the stacking up of ball bearings without restricting the operation thereof, even in a high gravity environment, within a flexible ball bearing remote control, having ball bearings along its length, contained within a race, and having a minimum bend radius, being comprised of a sleeve means to externally impart reversing bends, having a radius equal to the minimum bend radius of the flexible ball bearing remote control, to which it is affixed, said sleeve mean being placed along the length of the flexible ball bearing remote control device, so that friction between the ball bearings and their race prevents sliding of the ball bearings, wherein said means is composed of two semi-circular sleeves having mirror image mating faces of suitable material, containing an interior contour of reversing radii, having arcs equal to the minimum bend radius of the flexible ball bearing remote control to which it is applied, which come tangent at the center line and run out at an equal length from the center line a retaining cover means being comprised of a cylindrical tube of suitable material, having an internal diameter slightly less than the external diameter of the two semi-circular sleeves of the flexible ball bearing remote control device, being split along its length so that when spread to accommodate the two semi-circular sleeves it imparts sufficient pressure to securely align the two semi-circular sleeves when their mirror image mating faces are engaged around a flexible ball bearing remote control, and having a suitable attachment means regularly spaced along its external length to allow attachment of the cover means to the environment.

2. The device of claim 1 wherein the retaining cover means comprises two semi-circular halves and equipped with external spring hinges regularly spaced along its length to maintain a relative relationship of the semi-circular sleeves of the retaining cover means to a flexible ball bearing remote control.

* * * * *